United States Patent [19]

Inoue et al.

[11] 3,987,269

[45] Oct. 19, 1976

[54] METHOD OF CONTROLLING ELECTRICAL DISCHARGE MACHINING

[75] Inventors: Kiyoshi Inoue, Tokyo; Jinzo Yabe, Chofu, both of Japan

[73] Assignee: Inoue-Japan Research Incorporated, Yokohama, Japan

[22] Filed: Dec. 17, 1973

[21] Appl. No.: 425,130

[30] Foreign Application Priority Data

| Dec. 23, 1972 | Japan | 47-12883 |
| May 28, 1973 | Japan | 48-58741 |
| June 8, 1973 | Japan | 48-63749 |
| Aug. 8, 1973 | Japan | 48-88471 |
| Sept. 15, 1973 | Japan | 48-100692 |
| Sept. 19, 1973 | Japan | 48-105695 |

[52] U.S. Cl. .......................... 219/69 M; 219/69 C; 219/69 E

[51] Int. Cl.² .......................................... B23P 1/08

[58] Field of Search ............ 219/69 M, 69 C, 69 G, 219/69 S, 69 E

[56] References Cited
UNITED STATES PATENTS

| 2,794,109 | 5/1957 | Martin | 219/69 G |
| 3,536,881 | 10/1970 | Inoue | 219/69 C |
| 3,590,317 | 6/1971 | Sennowitz | 219/69 C |
| 3,609,281 | 9/1971 | Kauffman | 219/69 M |
| 3,623,148 | 11/1971 | Berghausen | 219/69 C |
| 3,649,802 | 3/1972 | Sennowitz | 219/69 C |
| 3,705,286 | 12/1972 | Kondo et al. | 219/69 G |
| 3,739,136 | 6/1973 | Marendaz | 219/69 M |
| 3,740,519 | 6/1973 | O'Connor | 219/69 E |
| 3,777,104 | 12/1973 | Bell | 219/69 G |
| 3,778,579 | 12/1973 | Takarada | 219/69 CX |

*Primary Examiner*—Bruce A. Reynolds
*Attorney, Agent, or Firm*—Karl F. Ross; Herbert Dubno

[57] ABSTRACT

A method of controlling electrical discharge machining in which a machining discharge is initiated and the particular geometric characteristic of the site of the discharge is ascertained by detecting at least one of the gap variables over a predetermined checking period of the discharge and evaluated with respect to a reference value. A parameter of the discharge, e.g. duration and/or current magnitude is established at a particular value preset to correspond to a particular geometric characteristic and the discharge is terminated in accordance with the regulated parameter.

6 Claims, 9 Drawing Figures

FIG. 7 ns in parameters of the machining discharge are set at suitable levels taking into account the nature of the tool electrode and the workpiece material and the nature of liquid dielectric.

METHOD OF CONTROLLING ELECTRICAL DISCHARGE MACHINING

FIELD OF THE INVENTION

The present invention relates to a method of controlling electrical discharge machining (EDM) and, more particularly, to a method of controlling an electrical discharge machining operation adaptively.

BACKGROUND OF THE INVENTION

A typical electrical discharge machining apparatus comprises means for holding a workpiece constituting a first electrode, a tool electrode spacedly juxtaposed with the first electrode across a dielectric filled machining gap, means for applying discharge-voltage pulses across the two electrodes to effect breakdown of the gap and produce an electrical discharge of a transient or short duration so that workpiece material is eroded or electrically removed, a servosystem or the like for maintaining the gap width at an optimum level as the material removal progresses, and means for supplying a dielectric liquid to the gap to sweep the removed detritus and discharge products therefrom.

Typical electrical discharge machining operations include rough-machining in which a high removal rate is obtained with a relatively rough machined surface, finish-machining in which an increased surface smoothness is attained with a reduced removal rate, and "medium" operations between these two extremes. For rough machining purposes, it is now possible to establish a "no wear" or low wear condition which permits the relative wear of the tool electrode to the workpiece material to be held at 0.1 to 1 percent. In order to establish these distinct machining operating conditions, parameters of the machining discharge are set at suitable levels taking into account the nature of the tool electrode and the workpiece material and the nature of liquid dielectric.

Even where "no wear" operation is desired, it has been necessary to permit a certain degree of tool wear in order to achieve a practically acceptable removal rate or to have the time expended for a particular machining purpose be practically acceptable.

It has been observed that the wear, under existing systems, tends to occur predominantly at contoured corners, ridge or tip portions of the tool electrode and, if the latter has a sharp cavity or recessed portion, that area of the workpiece which is directly juxtaposed thereto tends to be cut excessively compared with the other workpiece region. This has rendered it difficult to obtain a desired machining accuracy and the use of a number of electrodes for a single machining operation or limited the life of the tool at an undesired level.

OBJECT OF THE INVENTION

It is, therefore, the object of the present invention to provide a method and which permits a controlled wear or erosion of a tool electrode uniformly over its entire working area without sacrifice of the workpiece material removal rate thereby enabling to attainment of an increased machining accuracy, higher efficiency and improved surface finish while ensuring a prolonged use life of the tool electrode.

SUMMARY OF THE INVENTION

It has now been found that it is possible to ascertain at which location having a particular geometric characteristic (shape) of the tool electrode a machining discharge is occurring upon breakdown of the gap by measuring the magnitude of variable such as discharge voltage, discharge current, gap resistance, gap impedance or high-frequency component, preferably a combination of two or more of these variables. It has also been discovered that machining discharged occuring at locations having different geometric characteristics (shape) require distinct values of a discharge parameter or parameters to give a uniform tool erosion or regulated tool wear.

According to the present invention, therefore, a gap variable is detected upon initiation of a discharge and the geometric characteristic of the discharge is thereby ascertained, and means is provided for establishing the value of a parameter of the discharge, e.g. discharge current and/or discharge duration, preset to correspond to the particular geometric characteristic to complete the discharge with a regulated energy level. In other words, the geometry (shape) of the tool electrode has associated therewith a discharge characteristic (geometric characteristic of the discharge) which can be determined by monitoring the gap parameters and can be used to correct the total discharge to maintain a regulated energy level.

The gap variable or variables are measured over a checking period, preferably upon lapse of a predetermined time subsequent to initiation of each discharge, so that if the discharge is ascertained to be occuring in a flat or relatively round area, the "no wear" condition may be relaxed to a certain degree and if the discharge is ascertained to be occurring in a pointed or sharp-contoured area, the "no wear" condition may be tightened by adjusting the energy or power density of the discharge pulse applied, accordingly.

BRIEF DESCRIPTION OF THE DRAWINGS

These and more specific features and advantages of the invention will become more readily apparent from the following description, reference being made to the accompanying drawings in which:

FIG. 1(I), 1(II) and 1(III) are respectively a sectional view of a tool electrode having a certain configuration, voltage and current waveforms of a pulse illustrating the discovery leading to the present invention;

SPECIFIC DESCRIPTION

Referring to FIG. 1(I) here is illustrated a tool electrode 1 having contoured corners or ridges represented by A, planar areas represented by B, contoured portions represented by C immediately neighboring corners or ridges A, and indented regions represented by D.

Figure 1:
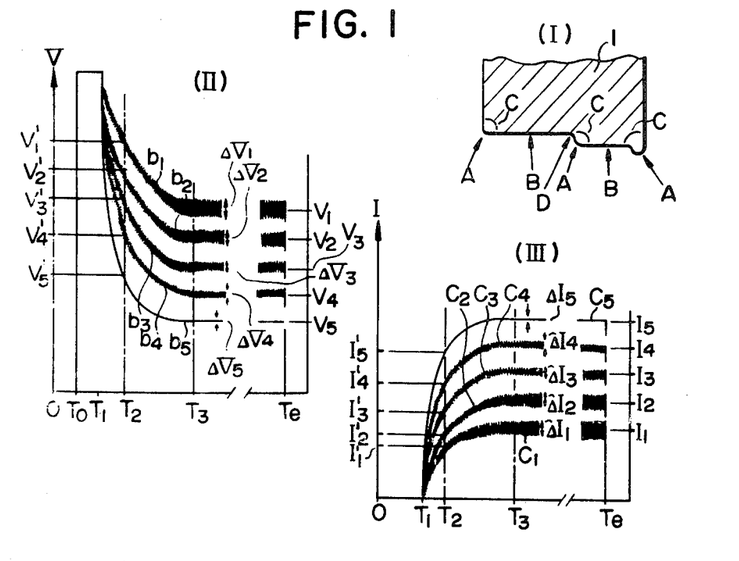

FIGS. 1(II) and (III) show, respectively, a set of voltage waveforms b1, b2, b3, b4 and b5, and current waveforms c1, c2, c3, c4 and c5 of a single machining discharge, demonstrating how the waveforms vary depending on the geometric characteristic of the location on which the discharge is created.

More specifically, the waveforms b1 and c1 represent respectively the voltage and the current of a discharge which is produced at a portion in an indent area as designated by D in FIG. 1(I). The waveforms b2 and c2 represent respectively the voltage and the current of a discharge which is produced at a portion on a planar area as designated by B. The waveforms b3 and c3 represent respectively the voltage and the current of a discharge which is occurring at a portion on a relatively contoured area as designated by C. The waveforms b4 and c4 represent the voltage and the current of a discharge which is created at a pointed portion or an a contoured corner or edge as represented by A in FIG. 1(II). The waveforms b5 and c5 represent respectively the voltage and the current of an arcing discharge, detrimental to machining, which may occur at any portion over the machining surface of the electrode 1.

The abscissa of the graphs, of course, represents time in which the voltage pulse is applied at time $T0$, and gap breakdown occurs and each discharge is initiated at time $T1$. At time $T3$, it is seen that there apply the following relationships, respectively, between voltage magnitudes $V1$, $V2$, $V3$, $V4$ and $V5$, between the magnitudes of high-frequency voltage component $\Delta V1$, $\Delta V2$, $\Delta V3$, $\Delta V4$ and $\Delta V5$, between current magnitudes $I1$, $I2$, $I3$, $I4$ and $I5$, and between the magnitudes of high-frequency current component $\Delta I1$, $\Delta I2$, $\Delta I3$, $\Delta I4$ and $\Delta I5$:

$$V1 > V2 > V3 > V4 > V5 \tag{1}$$

$$\Delta V1 > \Delta V2 > \Delta V3 > \Delta V4 > \Delta V5 = 0 \tag{2}$$

$$I1 < I2 < I3 < I4 < I5 \tag{3}$$

$$\Delta I1 > \Delta I2 > \Delta I3 > \Delta I4 > \Delta I5 \tag{4}$$

In addition, at time T=T2 which is shortly after the beginning of discharge, there is seen to apply the following relationships with respect to time rates of change of voltage and current:

$$\frac{dV1'}{dt} < \frac{dV2'}{dt} < \frac{dV3'}{dt} < \frac{dV4'}{dt} < \frac{dV5'}{dt} \tag{5}$$

$$\frac{dI1'}{dt} < \frac{dI2'}{dt} < \frac{dI3'}{dt} < \frac{dI4'}{dt} < \frac{dI5'}{dt} \tag{6}$$

Accordingly, by detecting at time T=T2 or T3 the DC component of the discharge or current or high frequency component either there or deriving these from the value of gap resistance or impedance between the machining electrode and the workpiece or detecting at time T=T2 the time rates of change of the variables, an accurate indication is obtained of the particular geometric characterisic of the locaton at which the discharge is created. For example, should the monitoring of the parameters give a voltage magnitudes $V_5$ or rate values $$\frac{dV5'}{dt} \text{ or } \frac{dI5'}{dt}$$

it is recognized that an arcing condition exists (abnormal condition) requiring termination. However the present invention is not primarily concerned with actions following detection of an arcine condition.

Assume that the detected parametes establish a voltage magnitude of $V_4$ and rate values of $$\frac{dV4'}{dt} \text{ or } \frac{dI4'}{dt}.$$

respectively. It can be seen that this identifies the discharge as occurring at the ridges or edges A and thus represent a "geometric characteristic" of the discharge which identifies and is associated with a geometric characteristic (shape and contour) of the tool electrode. The other characteristics with which the invention is concerned, namely indent, planar, and contoured can be similarly identified. These quantities or variables may be monitored singly for the purpose but in order to enhance accuracy of determination against possibility of change of the gap spacing from an optimum value, it is preferred to use the monitored variables in combination.

Figure 2:
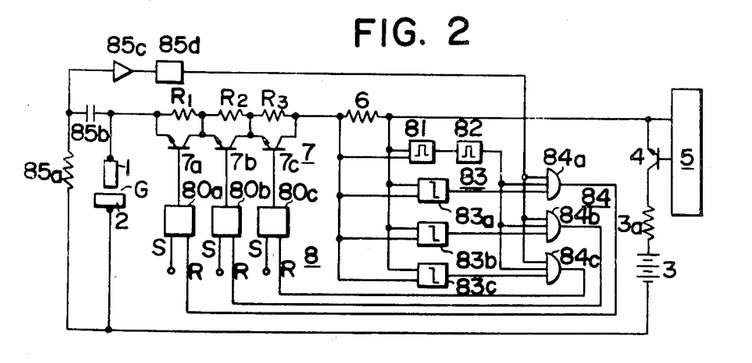
FIG. 2 is a schematic diagram of a system in which the magnitude of discharge current is controlled in accordance with the principles of the invention.

In FIG. 2 there is shown a tool electrode 1 spacedly juxtaposed with a workpiece 2 to define a machining gap G receiving a dielectric liquid. The electrode 1 and the workpiece 2 lie in series with a direct-current power source 3 and a power switch 4, the latter being represented by a transistor whose base and emitter terminals are arranged for energization by a signal pulse circuit 5 designed to turn the switch 4 on and off alternately thereby effecting across the gap G a series of machining discharges of a selected pulse duration and interval. As material removal proceeds, the tool electrode 1 and the workpiece 2 are relatively displaced by a servosystem (not shown) to maintain the machining gap G at a desired spacing. In the machining power circuit there are also provided a resistor 3a of a fixed resistance, a sensing resistor 6 and a variable impedance means 7. The latter comprises a plurality of resistors R1, R2 and R3 connected in series with the machining gap G and transistors 7a, 7b and 7c whose emitter-collector terminals of each are bridged across the resistors R1, R2 and R3, respectively. The transistors 7a, 7b and 7c are respectively energizable and rendered conductive by the outputs of flip-flops 80a 80b and 80c to shunt resistances R1, R2 and R3 selectively as described hereinafter.

The resistor 6 serves to sense the discharge current traversing the machining gap G and feeds into a monitor circuit generally represented by 8 and which includes a one-shot trigger circuit 81 which may comprise a Schmitt trigger and a monostable multivibrator. The function of the one-shot trigger circuit 81 is to define a predetermined time interval upon initiation of the discharge and, upon lapse of this time interval, to trigger a timer 82, e.g. monostable multivibrator, into operation thereby forming a checking pulse of a predetermined duration. The monitor circuit 8 also includes a threshold unit 83 consisting of a plurality of threshold discriminators 83a, 83b and 83c which may each be constituted by a Schmitt-trigger circuit and are designed to have different thresholds or triggering levels suitable to discriminate machining discharges from one another with respect to the magnitude of the discharge current and hence the geometric characteristic of the location at which the discharge is produced. Thus the circuits 83a, 83b and 83c may have their respective trigger levels set to correspond to a current magnitude between *I*1 and *I*2, a value between *I*2 and *I*3 and a value between *I*3 and *I*4 in characteristic waveforms represented in FIG. 1(III), and develop a 1 output when these thresholds are traversed.

The outputs of threshold circuits 83a, 83b and 83c are applied to AND gates 84a, 84b and 84c, respectively and the latter each also is adapted to receive the checking pulse from the timer 82 and has a third input terminal receiving the output of a high-frequency detector resistor 85a and capacitor 85b through an amplifier 85c and a signal shaping circuit 85d. The outputs of AND gates 84a, 84b and 84c are respectively connected to the reset terminals of flip-flops 80a, 80b and 80c noted previously. The high-frequency detector circuit develops and supplies a 1 output to the third input terminals of AND gates 84a, 84b and 84c when the discharge is detected to fail to contain a predetermined magnitude of the high frequency component.

At time T=T0 at which a voltage is applied across the machining gap G from the power source 3 as a result of conduction of the switch 4 by the triggering circuit 5, flip-flops 80a, 80b and 80c are all in set state so that transistors 7a, 7b 7c of the parameter control circuit 7 are all conductive and all of the resistors R1, R2 and R3 are shunted thereby. When a discharge is initiated (at time T=T1), sensing resistor 6 responds to the current and provides a signal which actuates the one-shot triggering circuit 81. Upon lapse of the time period set in the latter (for example, T1 to T3 in FIG. 1(III), the timer 82 operates to output the narrow checking pulse which enables AND gates 84a, 84b and 84c for the duration set in the timer 82.

If the discharge created is on a indent area as represented at D in FIG. 1(I), the threshold triggers will all remain deactuated and have an 0 output to hold all of the flip-flops 80a, 80b and 80c in the set condition. Transistors 7a, 7b and 7c are thus held conductive shunting the resistors R1, R2 and R3 so that the discharge may continue until it terminates at time T=Te with a preset maximum current magnitude suitable to maintain a desired "no wear" condition.

If the discharge created is on a planar area as represented at B in FIG. 1(I), the first threshold discriminator 83a will respond to an increased gap current signal which exceeds the lowest threshold level established at the threshold circuit 83 and provide a 1 signal to enable the AND gate 84a while the other two threshold units 83a and 83c will have an 0 output to disable the gates 84b and 84c. The AND gate 83a transmits the checking pulse issuing from the timer 82 therethrough to reset the flip-flop 80a. The transistor 7a is turned off thereby while transistors 7b and 7c are held on so that the resistor R1 becomes effective in the circuit connecting the power source 3 with the machining gap to reduce the magnitude of the discharge current to a preset value suitable for the discharge to proceed on a planar area while maintaining a desired "no wear" condition.

It will be apparent that if the discharge created is on a tip portion or contoured corner or ridge as represented at A in FIG. 1(I), all three discriminators 83a, 83b and 83c are triggered to enable the corresponding three gates 84a, 84b and 84c and as a result the flip-flops 80a, 80b and 80c are all reset to turn the three transistors 7a, 7b and 7c off. The resistors R1, R2 and R3 are rendered effective in the machining power circuit to bring down the magnitude of the discharge current at a lowest preset value suitable for the discharge to continue on such a particular location and for the tool electrode to sustain the degree of wear substantially same as where the discharge were created elsewhere or on a portion having different geometric characteristic.

It is of course, in accordance with the principles of the invention, where the discharge is occurring on a relatively contoured area as represented at C in FIG. 1(I) that the first and second threshold discriminators 83a and 83b are selectively triggered, the gates 84a and 84b are enabled and the flip-flops 80a and 80b are reset. Transistors 7a and 7b are turned off and resistors R1 and R3 are rendered effective to set the current magnitude at a moderate value.

In this manner, it is possible to limit the tool wear at contoured areas at a minimum level substantially same as at planar areas. Where the electrode has an intricate configuration or has many ridges, corners and contours in which a significantly high proportion of discharges are to be effected and/or a reduced machining time is important, it is possible to set the parameter of the discharge which establishes "no wear" condition for these areas and permits a certain excess wear of the tool electrode at its planar areas.

If the discharge initiated is of arc type or abnormal discharge such as short-circuiting, it will not contain a high-frequency component at least of appreciable amount and will be characterized by a reduced current level. Accordingly, the high-frequency detector 85a, 85b, 85c and 85d will have a 1 output as discussed earlier and threshold discriminators 83a, 83b and 83c are triggered together to produce a 1 output. The gate circuits 84a, 84b and 84c are enabled and resistors R1, R2 and R3 become effective to bring down the gap current at a minimum level.

In general, a uniform or increased "no wear" condition is attained by regulating or decreasing the impulse factor of discharge represented by the ratio of the current magnitude I to the duration of the discharge τ and hence by decreasing the current magnitude and/or increasing the duration of the discharge. The system of FIG. 2 thus represents control of the current magnitude for the purpose of the invention.

Figure 3:
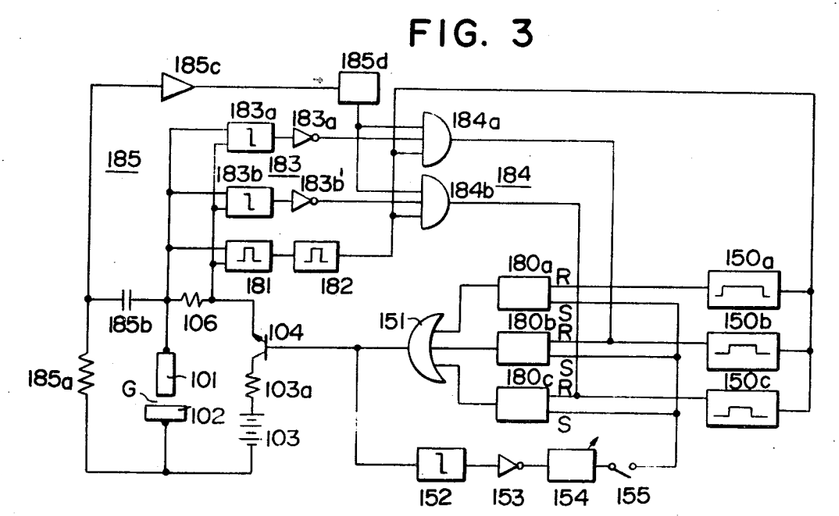
FIG. 3 is a schematic diagram of another embodiment of the invention in which the duration of discharge current is controlled.

FIG. 3 represents a system in which the impulse factor of discharge is regulated over a succession of pulses by increasing the duration of the discharge if the discharge is detected to be occurring on a contoured area such as a ridge or tip. The system includes a tool electrode 101 again shown spacedly juxtaposed with a workpiece 102 across a machining gap G to which a liquid dielectric is supplied as described previously. The electrode 101 and the workpiece 102 are connected in series with a direct-current machining power source 103, a diode 103a and a power switch 104 here schematically shown as a transistor and described previously. A discharge-current-sensing resistor is represented at 106 and a high-frequency detector is represented by a resistor 185a, a capacitor 185b, and amplifier 185c and a signal shaping circuit 185d. The high-frequency detector 185 is here adapted to develop a 1 signal at the output circuit 185d when a high-frequency component whose magnitude is in excess of a preset value, a value ΔV4 represented in FIG. 1(II) is detected.

The resistor 106 is here again adapted to develop a voltage drop timing the initiation of discharge and proportional to the discharge current, the voltage being applied via a one-shot trigger circuit 181 to a timer 182 and the latter providing a checking pulse to the inputs of AND gates as in the embodiment of FIG. 2. The threshold circuit 183 has threshold levels to discriminate discharges with respect to particular geometric characteristics of locations of on which discharges are created. Thus, a threshold discriminator 183a may have a triggering level set to correspond to a threshold current magnitude between I2 and I3 and a threshold discriminator 183b may have a triggering level set to correspond to a threshold current magnitude between I3 and I4 represented in FIG. 1(III). These discriminators respectively have 1 outputs when their triggering levels are traversed by the gap current signal detected at the sensing resistor 106 and are connected respectively to AND gates 184b of gate circuit 184 via inverters or NOT gates 183a' and 183b'. The outputs of AND gates 184a and 184b are connected to reset terminals of flip-flops 180b and 180c, respectively, whose outputs, together with the output of a third flip-flop 180a, from the input to an OR gate 151.

The output of the timer 182 is also applied to timers 150a, 150b and 150c, e.g. monostable multivibrators, provided to establish the duration of discharges pulses at three distinct values suitable for discharge occurring on a planar area, discharge occurring on a relatively moderate contour area and discharge occurring on a sharp contour on tip portion of the tool electrode, respectively. Thus, in this embodiment, the timer 150a is set to establish a discharge pulse of a relatively short duration, the timer 150b is set to establish a discharge pulse of a medium duration, and the timer 150c is set to establish a discharge pulse of a relatively long duration. The timers 150a, 150b and 150c are actuated in response to the checking pulse from the timer 182 and feed 1 outputs to reset terminals of flip-flops 180a, 180b and 180c, respectively, when their respective time durations are finished, to reset the flip-flops.

The OR gate 151 has a 0 output when any of flip-flops 180a, 180b and 180c is reset and renders the output of a Schmitt-trigger circuit 152 0 which is inverted by a NOT gate 153 to a 1 signal. This latter signal triggers a timer 154 e.g. a monostable multivibrator, which is provided to provide a predetermined time interval or "off" time between adjacent voltage pulses from the power source 103 across the machining gap G. A switch 155 is here connected between the output side of timer 154 and the junction connecting the sets terminal of flip-flops 180a, 180b and 180c together to commence and terminate a machining operation. The OR gate 151 is also arranged to energize the power switch when its output is a 1.

When the switch 155 is closed, flip-flops 180a, 180b and 180c are set. As a result, the OR gate has a 1 output to render the power switch 104 conductive thereby permitting machining voltage to be applied across the gap G from the source 103. Thereafter, when gap breakdown is effected and a discharge initiated through the machining gap G, the resistor 106 responds to the gap current flow and operates the one-shot triggering circuit 181. Upon lapse of a predetermined time period set in the latter, the narrow checking pulse appears at the output of the timer 182 and is applied to AND gates 184a and 184b. As described previously, the checking pulse is also applied to operate the timers 150a, 150b and 150c so that the latter may have 1 outputs upon finishing their respective preset time durations.

If the discharge produced is on a planar area, threshold circuits 183a and 183b continue to have 0 outputs which are inverted by NOT gates 184a and 184b to 1 signals and these 1 signals are applied to AND gates 184a and 184b. Then the high-frequency detector 185 will also have a 1 output for application to AND gates 184a and 184b. Consequently, these latter will have 1 output when the checking pulse is produced by the timer 182 to reset flip-flops 180b and 180c and render the outputs of flip-flops 180b and 180c 0 thereby rendering timers 150b and 150c ineffective. When the timer 150a finishes timing, the flip-flop 180a is reset to switch the output of the OR gate 151 to 1. The power switch 104 is thus turned off, terminating the discharge, with the duration controlled to meet the geometric characteristic of the discharge and the timer 154 initiates timing of the predetermined "off" time. When the "off" time is completed, flip-flops are set to switch the output of NOR gate 151 1 and the power switch 104 is thereby rendered conductive to permit machining voltage to be applied across the gap G.

If the next discharge created is on a sharp contour, edge or the like portion, both of threshold circuits 183a and 183b will be triggered to apply 0 signals to AND gates 184a and 184b via inverters 183a' and 183b'. AND gates 184a and 184b will also receive an 0 signal from the high-frequency signal and consequently have an 0 output when the checking pulse is produced by the timer 182. Flip-flops 180a, 180b and 180c are thus all rendered effective to receive the outputs 1 of timers 150a, 150b and 150c when their respective timing operations are finished. The OR gate is switched to 0 output when the timer 150c establishing the longest duration preset to meet the "sharp geometric discharge" has finished timing to turn off the power switch 104.

If the discharge created is on a moderately contoured area, the gate 184a has a 0 output while the gate 184b has a 1 output, the latter resetting flip-flop 180c thereby rendering the output of timer 150c ineffective. Timer 150a finishes timing earlier than timer 150b. Thus, when the latter timer which establishes the discharge duration suitable to meet the "moderate geometric discharge" has finished timing, the OR gate 151 is switched to 0 to turn off the power switch 104.

Figure 4:
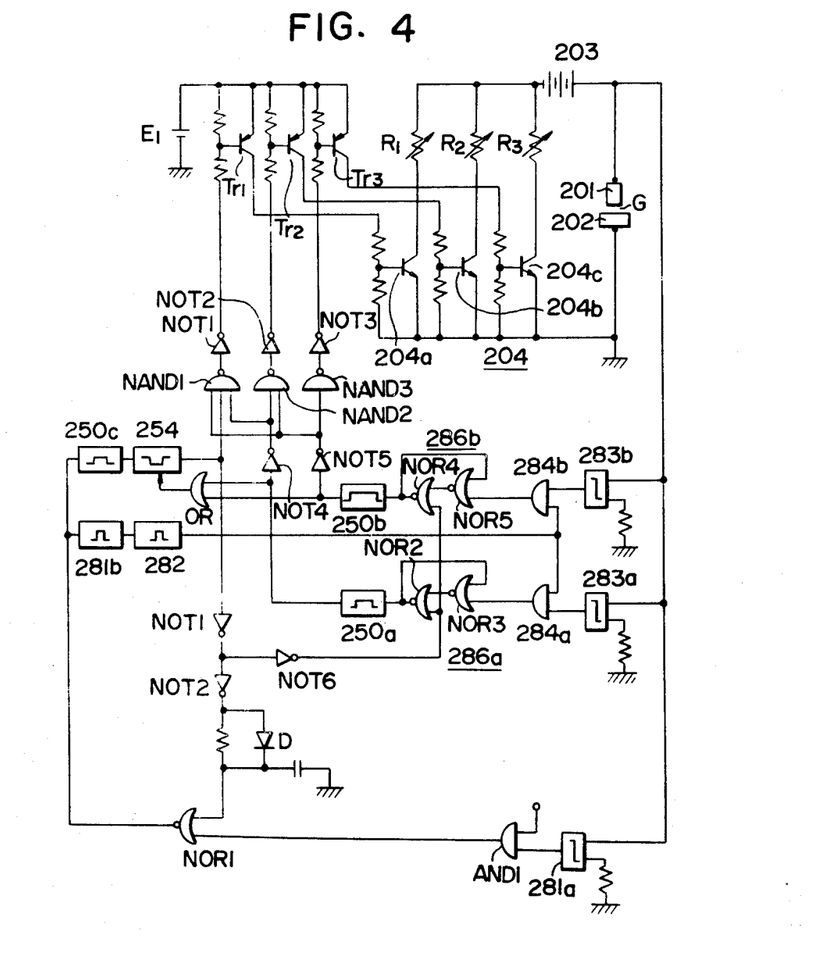
FIGS. 4 and 5 are schematic diagrams of further systems in which both the discharge magnitude and duration are controlled embodying the principles of the invention.

In FIG. 4 there is shown a further embodiment of the invention in which both the magnitude and the duration of discharges are controlled in accordance with geometric characteristics and the energy level of discharges are modified so that if discharge created is on a contoured portion the discharge may proceed in a "finish-machining" mode with a reduced energy; if the discharge created is on a planar area, it may proceed in a "rough-machining" with an increased energy; and if the discharge created is on a moderately contoured area, if may proceed in a "medium" machining mode with a moderate energy.

In this embodiment, a tool electrode, a workpiece and a machining power supply are represented at 201, 202 and 203, respectively. The discharge circuit of the system here includes a plurality of series circuits of current-determining variable resistors $R1$, $R2$, $R3$ and power transistors 204a, 204b, 204c, the series circuits being connected in parallel with one another. Power transistors 204a, 204b and 204c are arranged to be selectively triggered by drive transistors $Tr_1$, $Tr_2$ and $Tr_3$, respectively with the latter energized by a voltage source $E1$ and controlled by a control logic circuitry which will be described. Resistances of variable resistors $R1$, $R2$ and $R3$ are preset at suitable values to establish distinct discharge current magnitudes in accordance with particular geometric characteristics of discharge sites. Signals representing these characteristics will be hereinafter briefly referred to as "geometric signals."

The control system includes timers 250a, 250b and 250c designed to establish discharge pulses of a moderate, a relatively long and a relatively short time duration, respectively, and may each be constituted by a monostable multivibrator having a variable setting. The timer 250c is here coupled with a further timer 254 which may again be a monostable multivibrator and establish the "off" time or time interval between adjacent machining voltage pulses across the machining gap $G$ at a preset level.

A device for ascertaining discharge sites or deriving "geometric signals" includes a Schmitt-trigger circuit 281a connected across the machining gap $G$, this circuit having a triggering level in excess of discharge voltage and being designed to issue to a gate AND1 1 output when a voltage builds up across the machining gap $G$ upon triggering of the power switch 204 and 0 output upon gap breakdown or initiation of discharge thereafter. The output of the gate AND1 is applied to a gate NOR1 which has a second input terminal connected with the output of the timer 254 via two inverters NOT1 and NOT2 and a delay network D.

The timer 254 has a 0 output when it has finished timing the "off" time, the output being fed to the control terminals of drive transistor $Tr1$ via gates NAND1 and NOT1 to turn on the drive transistor which in turn renders power transistor 204a conductive thereby permitting machining voltage to be applied across the machining gap $G$ from the power source 203. The 0 output of the "off time" setting timer 254 is also transmitted to the gate NOR1 with a delay time established by the delay network D. Accordingly, the output of the gate NOR1 is switched to 1 upon lapse of this delay time after deactuation of the timer 254 and is applied to a timer 281b. Upon lapse of a period of time set therein, say, of several microseconds, the timer 281b issues a signal which operates a further timer 282 whereby a checking pulse is produced and a checking period is thus provided. The checking pulse is applied to AND gates 284a and 284b to enable same to be responsive to "geometric signals" from the machining gap G for the duration of the checking pulse, the checking period. The discharge site geometry is ascertained by threshold discriminators 283a and 283b connected across the gap and each of which may here again be constituted by a Schmitt-trigger circuit. Thus, the first discriminator 283a has its triggering level corresponding to a threshold discharge voltage between $V3$ and $V4$ and the second discriminator 283b has its triggering level corresponding to a threshold discharge voltage between $V2$ and $V3$ in the characteristic wove-forms represented in FIG. 1(II).

So shown, the output of the gate NOR1 is also connected to the timer 250c. Thus, upon receipt of the 1 output from the gate NOR1, the timer 250c initiate timing. If the discharge created is on a contoured portion or of an arc-type, discriminators 283a and 283b will neither be triggerable and have 0 outputs consequently, AND gates 284a and 284b will both a 0 output. These gates have storage circuits 286a and 286b at their respective output sides. Here the storage circuit 286a consists of gates NOR2 and NOR3 while the storage circuit 286b consists of gates NOR4 and NOR5, both arranged as shown. The output of the storage circuit 246a is connected to the timer 250a which in turn is connected to an inverter NOT4 whose output is connected to the inputs of gates NAND1 and NAND2. The output of the storage circuit 286b is connected to the timer 250b which in turn is connected to an inverter NOT5 whose output is connected to the inputs of gates NAND1, NAND2 and NAND3. The output of NAND2 is connected to the drive transistor $Tr2$ via an inverter NOT2 while the output of NAND3 is connected to the drive transistor $Tr3$ via an inverter NOT3.

Accordingly, if the discharge created is on a contoured portion or of arc-type, storage circuits 286a and 286b remain deactivated and no output appears either from timer 250a or 250b. Thus, only the switch 204a remains conductive limiting the discharge current at a minimum magnitude determined by resistor $R1$ and the discharge terminates with a minimum duration established by the timer 250c.

The O output of timer 254 is also fed to gates NOR2 AND NOR4 in storage circuits 286a and 286b via gates NOT1 and NOT6 to enable gates NOR2 and NOR4 to be responsive to the outputs of gates NOR3 and NOR5, and hence to the outputs of AND gates 284a and 284b. And, the output terminals of timers 250a and 250b are connected with the input terminals of a gate OR whose output terminal is connected with the "offtime" setting timer 254 so that if either of timers 250a or 250b has a 1 output, the timer 254 may be held unactuated.

If the discharge created is on a moderately contoured area, the discriminator 283a is triggered to provide a 1 output while the discriminator 283b is not triggered. As a result, the AND gate 284a has a 1 output during the checking pulse and this signal is fed to the storage circuit 284a whose output is thus switched to 1. The latter signal triggers the timer 250a to cause the same to initiate timing and has a 1 output for the duration set therein. The 1 output of the timer 250a is applied to gates NAND2 and NAND1 via inverter NOT4 to switch the output of the gate NAND2 to 1 while holding the output of the gate NAND1 at 1. Thus, the drive transistor $Tr1$ is held conductive and the drive transistor $Tr2$ is turned on. Hence the power transistor 204a is held on and the power transistor 204b is turned on for the duration set at the timer 250a so that there results a machining discharge of the moderate current magnitude determined by resistances $R1$ and $R2$ and the moderate pulse width.

In the discharge created is on a planar area, both of discriminators 283a and 283b will be triggered to develop 1 signals at their respective outputs. The 1 signals enable storage circuits 286a and 286b thereby triggering two timers 250a and 250b into operation simultaneously. The outputs of timers 250a and 250b feed, via gates NOT4 and NOT5, into three gates NAND1, NAND2 and NAND3 whose respective outputs 1 are inverted by gates NOT1, NOT2 and NOT3 to hold drive transistor Tr1 on and turn other drive transistors Tr2 and Tr3 on so that all three resistors $R1$, $R2$ and $R3$ become effective in the discharge circuit to establish a maximum current magnitude determined thereby. As mentioned previously, timer 250b has a longer operating duration than timer 250a and 250c and, as a result, power transistors 204a, 204b and 204c remain conductive until the timer 250b has finished its timing, forming a machining discharge of the maximum pulse width.

When the discharge pulse terminates, gate OR is enabled and permits the timer 254 to initiate the timing of the "off" time. If the discharge is on a contoured portion and consequently only the timer 250c is operated, the latter timer of course provides a signal triggering the "off" timer 254 into operation. And, when the discharge terminates, circuits 286a and 286b are released from storage conditions until the application of a next machining voltage.

Figure 5:
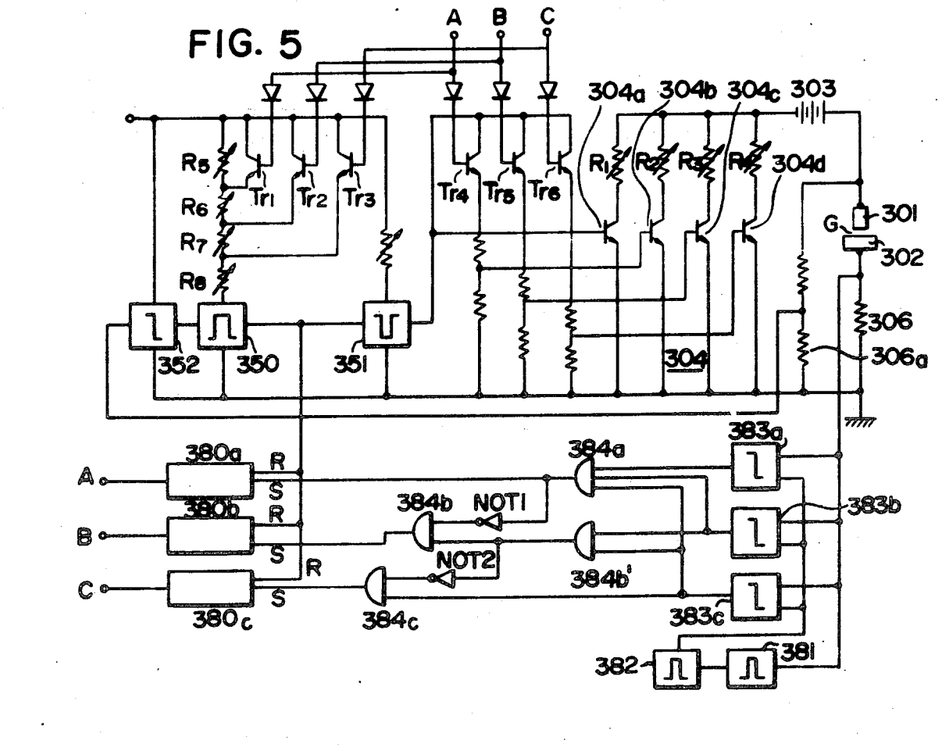

Another embodiment of the invention illustrated in FIG. 5 is designed to control and adjust the pulse factor Ip/τ (Ip: the magnitude of discharge current and τ: the discharge pulse width) in accordance with "geometric signals" developed so that if the discharge created is on a contoured portion the discharge may proceed with a smaller impulse factor and if the discharge created is on a planar area it may proceed with a larger impulse factor. The magnitude of impulse factor may thus be preferably set at 1 or a value less than 1 for a discharge taking place on a contoured portion, at a value between 1 and 3 for a discharge taking place on a relatively moderately contoured area, and at a value between 3 and 30 and it has been found that these settings result in material removal at a relatively contoured area 1.5 times that at a contoured area, and material removal at a planar area 2 times that at the contoured area, and an eventual removal rate three to five times that achievable with uncontrolled or conventional machining modes while ensuring a resultant surface roughness substantially same as the latter modes. Optimum setting of the inpulse factor is made in accordance with the degree of contamination of the dielectric machining liquid and also taking into account of materials of the tool electrode and the workpiece.

The power supply circuit in FIG. 5 comprises a direct-current source 303 connected in series with the machining gap formed between a tool electrode 301 and a workpiece 302 and a power switch 304. The latter network comprises power transistors 304a, 304b 304c and 304d of npn type whose respective collector terminals are connected with the negative terminal of the current source through resistors R1, R2, R3 and R4 and whose respective emitter terminals are connected with the workpiece 302 via a sensing resistor 306. The resistor R1 is here designed to determine the current magnitude in an initial period of time of each machining pulse while resistors R2, R3 and R4 are rendered selectively effective in the discharge circuit when transistors 304b, 304c and 304d are turned on by particular "geometric signals" respectively in the manner being described. The transistor 304a is turned on to lay the resistor R1 in the discharge circuit in response to a signal representing the termination of the operation of an "on" timer 350 which defines the duration of machining pulses or the initiation of the operation of an "off" timer 351 which defines the time interval between adjacent machining voltage pulses.

The "off" timer 351 may of course be arranged to establish the "off" time at various values to set up various machining conditions. The "on" timer has a plurality of resistors R5, R6, R7, R8 each of which is settable at various values to establish the machining pulses "on" time at different levels and which are tied with drive transistors Tr1, Tr2 and Tr3 respectively energizable by particular "geometric signals" which develop at terminals A, B and C, respectively.

Terminals A, B and C have also drive transistors Tr4, Tr5 and Tr6 coupled therewith to respond to particular "geometric signals" respectively and arranged for energization of power transistors 304b, 304c and 304d respectively.

It is apparent that resistors R1, R2, R3 and R4 are set in conjunction with resistors R5, R6, R7 and R8 so that in this case three distinct magnitudes of the inpulse factor Ip/τ may be provided.

Shown connected across the machining gap G is a voltage divider 306a, a portion of which is applied to a trigger circuit 352 having a triggering level between "noload" gap voltage and discharge voltage, and feeding into the input of the "on" timer 350. The function of the voltage divider 306a and the trigger circuit 352 is to sense the initiation of discharge and thereupon to trigger the "on" timer 350 into operation, The "off" timer 351 is arranged to be triggered into operation upon termination of the operation of the "on" timer 350.

A system for ascertaining discharge sites and developing "geometric signals" here again includes elements 381 and 382 connected with the sensing resistor 306 and adapted to produce a checking pulse as previously described. The checking pulse is produced here again upon lapse of a preselected time after the initiation of each discharge (time $T_1$–$T_3$ in the graphs of FIG. 1), the time being preferably 0.5 microsecond in finish-machining operations which utilize a pulse width less than 10 microseconds, 1 microsecond in machining operations which utilize pulse width of 10 to 50 micronseconds, a 3 microseconds in machining operations which utilize a pulse width of 50 to 100 microseconds and 5 microseconds in rough-machining operations which utilize a pulse width of 100 to 1000 microseconds.

As in the previous embodiments threshold discriminators 383a, 383b and 383c are also connected with the resistor 306 and arranged to be responsive to the gap current for the duration of the checking pulse. Thus, discriminator 383a may have a triggering level corresponding to a threshold current between I3 and I4, a discriminator 383b may have a triggering level corresponding to a threshold current between I2 and I3 and discriminator 383c may have a triggering level corresponding to a threshold current between I1 and I2 represented in the graph of FIG. 1(III).

The output of the first discriminator 383a is applied to an AND gate 383a which has second and third input terminals connected with the outputs of the second and third discriminators 383b and 383c, respectively. The output of AND gate 384a is tied with the set terminal of a first flip-flop 380a which has the output terminal A. A second flip-flop 380b having the output terminals B has its set terminal connected ith the output of an AND gate 384b, the latter having the first input terminal connected with the output of AND gate 384a via an inverter NOT1 and the second input terminal connected with the output of an AND gates 384b to which the outputs of discriminators 383b and 383c are applied. The output of AND gate 384b' is also input to an AND are 384c via an inverter NOT2 and the AND gate has the second input terminal connected with the output of discriminator 383c and its output tied with the set terminal of a third flip-flop 380c having the output terminal C. The reset terminals of flip-flops 380a, 380b and 380c are tied with the junction connecting the "on" timer 350 with the "off" timer 351. These flip-flops are thus reset when each discharge pulse is terminated or an "off" signal is produced When the "off" timer 351 has finished its preset timing operation, a signal is developed which triggers the power transistor 304a into conduction permitting the output voltage from the source 303 to be applied across the machining gap G. Therefter, when a discharge is commenced through the gap G, the resistor 306 responds to a gap voltage drop and the circuit 352 is triggered to operate the "on" timer 350. Upon lapse of a time established at the timer 381, discriminators 383a, 383b and 383c are enabled to respond to the gap current by the output of the timer 382.

If the discharge created is on a contoured portion, the AND gate 384a will develop a 1 output which sets the first flip-flop 380a and causes the latter to develop a 1 output. As is readily apparent, both the outputs of AND gates 384b and 384c are then 0 and as a consequence the second and third flip-flops 380b and 380c remain in reset states. The 1 output of the first flip-flop renders drive transistors Tr1 and Tr4 conductive so that the former transistor shunts the resistor R5 while the latter transistor R5 while the latter transistor turns the power transistor 304b on. As a result, the current magnitude of the gap discharge is set at a value determind by resistors R1 and R2, i.e. a minimum machining discharge current and the pulse width after the checking period is set at a level determined by resistors R6, R7 and R8, i.e. a maximum pulse width, hence with a minimum imuplse factor Ip/τ.

If the discharge created is on a moderately contoured portion, only the second flip-flop 380b will be set and transistors Tr2 and Tr5 thereby rendered conductive to shunt resistors R5 and R6 and turn on the power transistor 304c. Then, machining discharge is established and terminates with the current magnitude determined by resistors R1 and R3, i.e. a moderate current magnitude and the plse width determined by resistors R7 and R8, i.e. a moderte pulse width, hence with a moderate impulse factor Ip/τ.

If the discharge created is on a planar ara only the third flip-flop 380c will be set and transistors Tr3 and Tr6 thereby rendered conductive to shunt resistors R5, R6 and R7 while turning on the power transistor 304d. Thus, machining discharge is adjusted and terminates with the current magnitude determined by R1 and R4, i.e. a maximum current magnitude and the pulse width after checking period determind by resistor R8, i.e. a mimimum pulse width, hence with a maximum impulse factor Ip/τ.

Figure 6:
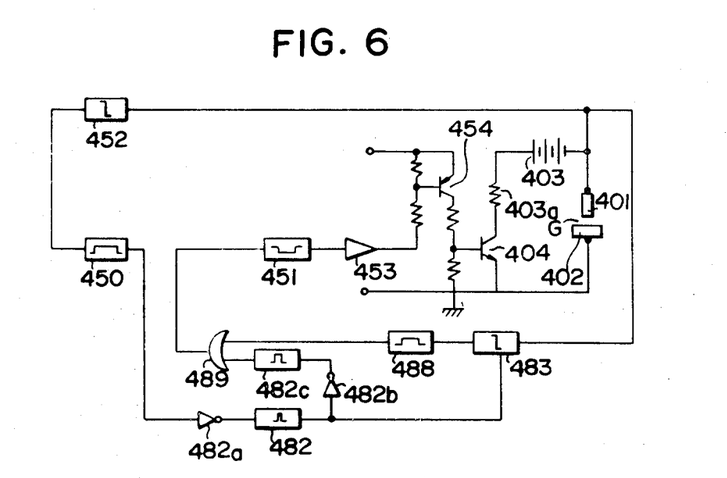
FIG. 6 is a schematic diagram of a still further embodiment of the invention which represents a modification of the system of FIG. 3. FIG, 7 is a schematic diagram of a still further embodiment of the invention which represents a modification of the system of FIG. 5.

In FIG. 6, there is shown a modification of the embodiment of FIG. 3 in which the pulse width is controlled in response to "geometric signals."More specifically, the system of FIG. 6 is designed to stretch the "on" time when at the end of the "on" pulse, the discharge effected is detected to be on a contoured portion.

Here again, a tool electrode 401 is shown spacedly juxtaposed with a workpiece 402 to form a machining gap G therebetween, the tool electrode 401 and the workpiece being connected in series with a direct-current power supply 403 via a current-determining resistor 403 a and a power switch represented by a power transistor 404. The latter is energized and rendered conductive by the output of a drive transistor 454 which is rendered conductive by the output of an amplifier 453 when an "off" timer 451 has finished its preset timing. Upon the gap breaking down, a trigger circuit 452, e.g. Schmitt-trigger circuit responds to a gap voltage drop and operates an "om" timer 450. At the end of the "on" pulse whose duration is preset at the "on" timer 450, the latter issues a signal which is applied to a checking pulser 482 via an inverter 482a.

The checking pulse from the checking pulser 482 enables a threshold discriminator 483, e.g. Schmitttrigger circuit, whose triggering level may be set to correspond to a threshold gap voltage, e.g. a value between V2 and V3 represented in FIG. 1(II). If the discharge voltage is detected, during the checking period, to be in excess of this threshold value indicating that the discharge is occurring on a planar area, the trigger circuit in this embodiment provides a O signa holding deactuated a timer 488 coupled with the output thereof. The output of the timer 488 is tied with the first input terminal of an OR gate 489 whose second input terminal is connected with a timer 482c which is in turn connected with the output of the checking pulser 482 via a inverter 482b. Accordingly, the OR gate 489 is enabled upon lapse of a short duration set in the timer 482c after termination of the checking pulse to trigger the "off" timer 451 into operation and cause the latter to time its preset time duration.

On the contrary, if the discharge voltage is detected, in the checking period, to be less than the threshold value indicating that the discharge is produced on a contoured portion, the discriminator 483 triggers the timer 488 into operation. Consequently, the OR gate will be enabled only after the termination of the "stretch" time set in the timer 488 to trigger the "off" timer 451 into operation.

Thus, here again, the impulse factor of discharge pulses is regulated or controlled in accordance with "geometric signals" or in accordance with particular geometric characteristics of sites on the tool electrode at which the discharges are produced.

In order to dscriminate between a detrimental arctype discharge and an acceptable discharge occurring on a contoured portion, both of which are characterized by a reduced voltage magnitude or an increased current magnitude an adequate means may be provided. As mentioned previously, the acrtype discharge is characterized by absence of high-frequency component. Thus, a circuit may additionally be provided which is responsive to the high-frequency component and the "off" timer may be controlled in response to the output of the detector circuit to stretch the "off" time when the highfrequency component is not detected in the checking period of the previous pulse. Of course, the "on" timer or the discharge circuit or both may be controlled alternatively or additionally to modify the energy level of discharges.

Further investigations have revealed that in the course of a machining operation, when the tool electrode after having retracted from the workpiece by action of the servomechanism or a gap-dependent or -independent electrode reciprocating system approaches the workpiece and a normal machining mode is being resumed, machining discharges tend to be effected predominantly first on relatively contoured portions and then on relatively planar areas. It is thus desirable to modify the impulse factor Ip/τ from a lower level to a higher level continuously or step-wise as the tool electrode and the workpiece are approached and a normal machining position recovered.

Figure 7:
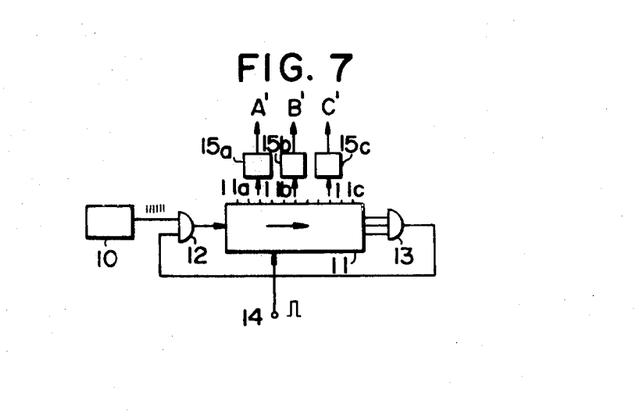

FIG. 7 illustrates a device which may be associated with the control circuitry of FIG. 5 to embody this aspect of the present invention. The device comprises a clock pulser 10 which feeds into a counter 11 via an AND gate 12 whose second input is fed back from the counter via an AND gate 13. The counter 11 is here designed to receive a signal pulse at an input 14 in synchronism with an instant at which a normal discharge condition is being resumed after the previous retraction of the tool electrode from the workpiece. When the signal pulse is received, the counter 11 is adapted to clear the accumulated count and commence recounting clock pulses from the pulser 10. When the counter 11 counts up a preset number of clock pulses, it provides a signal at its output terminal 11b which is held by a hold circuit 15a. A 1 signal is developed at terminal A' for the duration determined by the hold circuit 15a and is applied to the terminal A to establish the impulse factor at a minimum level.

When the counter 11 has counted up a further preset number of clock pulses, a 1 signal is likewise developed at the terminal B' and is applied to the terminal B in FIG. 5 to modify the impulse factor at a moderate level. Then, the output at terminal A' may disappear. When the counter 11 has a conted up a still further number of clock pulses, terminal C' will have a 1 output for the duration determined by the hold circuit 15c and this signal is applied to the terminal C to set the impulse factor at a maximum level. A step-wise control of the impulse factor in the course of the electrode approach to the workpiece is achieved effectively in this manner and an improved and ready control of wear uniformly over the entire tool electrode surface is attained.

We claim:

1. In a method of electrically machining a workpiece in which a tool electrode is spacedly juxtaposed with the workpiece across a dielectric-filled machining gap, the electrode can have a multiplicity of geometrically different contours including ridge, edge, indent an planar configurations, and a series of electrical machining discharges are applied to the gap to remove material from the workpiece, the improvement which comprises the steps of:

determining values for a first parameter of electrical discharge across the gap the levels of this parameter being characteristically determined by the respective configuration and being sufficiently different from one another to enable detection of the respective level to discriminate between said configurations;

establishing respective threshold levels for said first parameter corresponding to the determined values;

detecting the said first parameter during a machining discharge and comparing the detected parameter with said threshold levels; and regulating a second parameter of the latter discharge in a respective one of a plurality of predetermined modes respectively corresponding to said threshold levels upon the detected first parameter attaining a respective threshold level to establish a corresponding value of said second parameter to the end of the said machining discharge.

2. The improvement defined in claim 1 wherein said first electrical parameter is one of the parameters of gap resistance, gap impedance, discharge current, discharge voltage and high frequency component of the machining discharge and is measured over a selected period subsequent to the initiation of the said machining discharge.

3. The improvement defined in claim 1 wherein said second parameter is the duration of the machining discharge pulse.

4. The improvement defined in claim 1 wherein said second parameter is the magnitude of the machining discharge current.

5. The improvement defined in claim 1 wherein said second parameter is a combination of the duration of the machining discharge pulse and the magnitude of the machining discharge current.

6. The improvement defined in claim 1 wherein said second parameter is the ratio of the magnitude of the discharge current to the duration of the ddischarge pulse for the machining discharge.

* * * * *